United States Patent
Chappell et al.

(10) Patent No.: US 9,298,632 B2
(45) Date of Patent: Mar. 29, 2016

(54) HYBRID CACHE STATE AND FILTER TRACKING OF MEMORY OPERATIONS DURING A TRANSACTION

(75) Inventors: Robert S. Chappell, Portland, OR (US); Ravi Rajwar, Portland, OR (US); Zhongying Zhang, Portland, OR (US); Jason A. Bessette, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 13/535,788

(22) Filed: Jun. 28, 2012

(65) Prior Publication Data

US 2014/0006698 A1    Jan. 2, 2014

(51) Int. Cl.
| | | |
|---|---|---|
| G06F 12/00 | (2006.01) | |
| G06F 13/00 | (2006.01) | |
| G06F 13/28 | (2006.01) | |
| G06F 12/08 | (2006.01) | |
| G06F 9/46 | (2006.01) | |

(52) U.S. Cl.
CPC ............ G06F 12/0842 (2013.01); G06F 9/467 (2013.01); G06F 12/0897 (2013.01)

(58) Field of Classification Search
CPC .............................. G06F 9/467; G06F 12/0842
See application file for complete search history.

(56) References Cited

U.S. PATENT DOCUMENTS

| | | | | |
|---|---|---|---|---|
| 5,581,729 | A  * | 12/1996 | Nishtala et al. ................ | 711/143 |
| 5,701,503 | A  * | 12/1997 | Singh et al. .................... | 711/126 |
| 5,822,755 | A  * | 10/1998 | Shippy .......................... | 711/118 |
| 6,862,646 | B2 * | 3/2005 | Bonola et al. ................. | 710/306 |
| 7,206,903 | B1 * | 4/2007 | Moir .................. | G06F 12/0842 |
| | | | | 711/130 |
| 7,685,365 | B2 * | 3/2010 | Rajwar et al. ................. | 711/118 |
| 8,001,538 | B2 * | 8/2011 | Gray et al. .................... | 717/141 |
| 8,180,967 | B2 * | 5/2012 | Rajwar .............. | G06F 9/30087 |
| | | | | 711/135 |
| 8,180,971 | B2 * | 5/2012 | Scott et al. .................... | 711/141 |
| 8,185,698 | B2 * | 5/2012 | Saha .................... | G06F 9/3834 |
| | | | | 711/141 |
| 8,200,909 | B2 * | 6/2012 | Saha .................... | G06F 9/3834 |
| | | | | 711/141 |
| 8,250,133 | B2 * | 8/2012 | Blumrich et al. ............ | 709/201 |
| 8,275,942 | B2 * | 9/2012 | Yigzaw .............. | G06F 12/0842 |
| | | | | 711/118 |
| 8,352,688 | B2 * | 1/2013 | Chung et al. .................. | 711/150 |
| 8,375,175 | B2 * | 2/2013 | Dice ........................ | G06F 12/00 |
| | | | | 711/152 |
| 8,543,775 | B2 * | 9/2013 | Chung et al. .................. | 711/150 |
| 8,661,204 | B2 * | 2/2014 | Dwarkadas ............ | G06F 9/524 |
| | | | | 711/141 |
| 9,037,554 | B2 * | 5/2015 | Cypher .................. | G06F 9/467 |
| | | | | 707/698 |

(Continued)

OTHER PUBLICATIONS

Definition of doomed, The Free Dictionary, retrieved from http://www.thefreedictionary.com/doomed on Jul. 23, 2014 (1 page).*

(Continued)

*Primary Examiner* — Tuan Thai
*Assistant Examiner* — Daniel C Chappell
(74) *Attorney, Agent, or Firm* — Trop, Pruner & Hu, P.C.

(57) ABSTRACT

In one embodiment, a cache memory can store a plurality of cache lines, each including a write-set field to store a write-set indicator to indicate whether data has been speculatively written during a transaction of a transactional memory, and a read-set field to store a plurality of read-set indicators each to indicate whether a corresponding thread has read the data before the transaction has committed. A compression filter associated with the cache memory includes a first filter storage to store a representation of a cache line address of a cache line read by a first thread of threads before the transaction has committed. Other embodiments are described and claimed.

20 Claims, 8 Drawing Sheets

(56) References Cited

U.S. PATENT DOCUMENTS

| | | | |
|---|---|---|---|
| 2007/0198781 A1* | 8/2007 | Dice et al. | 711/145 |
| 2007/0245099 A1* | 10/2007 | Gray et al. | 711/156 |
| 2007/0245309 A1* | 10/2007 | Gray et al. | 717/115 |
| 2008/0104332 A1* | 5/2008 | Gaither et al. | 711/141 |
| 2008/0189487 A1 | 8/2008 | Craske | |
| 2009/0138890 A1* | 5/2009 | Blake | G06F 9/466 718/106 |
| 2009/0259713 A1* | 10/2009 | Blumrich et al. | 709/201 |
| 2009/0276573 A1* | 11/2009 | Frank et al. | 711/118 |
| 2010/0037027 A1 | 2/2010 | Prudvi et al. | |
| 2010/0169579 A1 | 7/2010 | Sheaffer et al. | |
| 2010/0191930 A1 | 7/2010 | Groff et al. | |
| 2010/0332765 A1* | 12/2010 | Cypher | 711/141 |
| 2012/0124293 A1* | 5/2012 | Chung et al. | 711/128 |
| 2012/0144126 A1 | 6/2012 | Nimmala et al. | |
| 2012/0179877 A1* | 7/2012 | Shriraman | G06F 9/524 711/141 |
| 2012/0233411 A1* | 9/2012 | Pohlack et al. | 711/147 |
| 2013/0339618 A1* | 12/2013 | Alexander et al. | 711/133 |
| 2015/0186178 A1* | 7/2015 | Kassa | G06F 9/528 718/101 |
| 2015/0242322 A1* | 8/2015 | Vajapeyam | G06F 12/0811 711/119 |
| 2015/0277967 A1* | 10/2015 | Calciu | G06F 9/467 711/147 |

OTHER PUBLICATIONS

Definition of doomed, The Free Dictionary, retrieved from http://www.thefreedictionary.com/doomed on Dec. 12, 2014 (3 pages).*

Transactional Memory: Architectural Support for Lock-free Data Structures, Herlihy et al, Proceedings of the 20th Annual International Symposium on Computer Architecture, May 16-19, 1993, pp. 289-300 (12 pages).*

International Searching Authority, "Notification of Transmittal of the International Search Report and the Written Opinion of the International Searching Authority," mailed Oct. 18, 2013, in International application No. PCT/US2013/046709.

* cited by examiner

HYBRID CACHE STATE AND FILTER TRACKING OF MEMORY OPERATIONS DURING A TRANSACTION

BACKGROUND

As the size and complexity of modern processors and software increases, the demands upon transactional memory have steadily increased. Transactional memory (TM) systems track speculative reads and buffer speculative writes that occur during the transaction to provide the illusion of atomicity. The transactional read-set refers to the set of memory addresses that are read but not written during the execution of a transaction. The transactional write-set refers to the set of memory addresses that are written during the execution of a transaction. The memory addresses in the read-set and write-set are typically of the same granularity as the underlying coherency units in the memory system (usually cache lines).

When applied to multicore processors, there is an increasing demand upon the transactional memory system to successfully manage the actions that occur amongst the distribution of caches present in the core. The increase in demand has led to an increased size in structures to support transactional memory, however these steadily become more inefficient as structure size increases. Another problem facing a programmer is that while these methods exist for the management of transactional memory and the processes by which to track their functions, these methods are unable to efficiently manage the volume of data present in current devices.

DETAILED DESCRIPTION

In various embodiments, a transactional memory implementation can be provided within a processor such as a multicore processor having multiple levels of a cache hierarchy. More specifically, embodiments can provide read-set and write-set tracking state that can efficiently propagate through this cache hierarchy. To this end, one or more levels of the cache memory may provide for storage of read-set and write-set tracking information as state or status information within cache lines accessed during a transaction. Such status information can propagate throughout the levels of the cache hierarchy.

However, one or more such levels may not include this state information. To enable correct tracking even in the absence of such state information in one or more levels, a compression filter can be associated with at least certain levels of the cache hierarchy such that any cache lines including read-set tracking state information evicted from such cache level can have an entry stored in a corresponding compression filter to thus enable correct transaction operation. This compression-based filter thus maintains read-set tracking for all cases where a cache line is displaced from a cache level where the read-set status information cannot be propagated. In addition, embodiments may make greater and more efficient use of cache space for maintaining transactional write-set data, as embodiments may provide a storage preference for cache lines associated with write-set data, as will be described herein.

Figure 1:
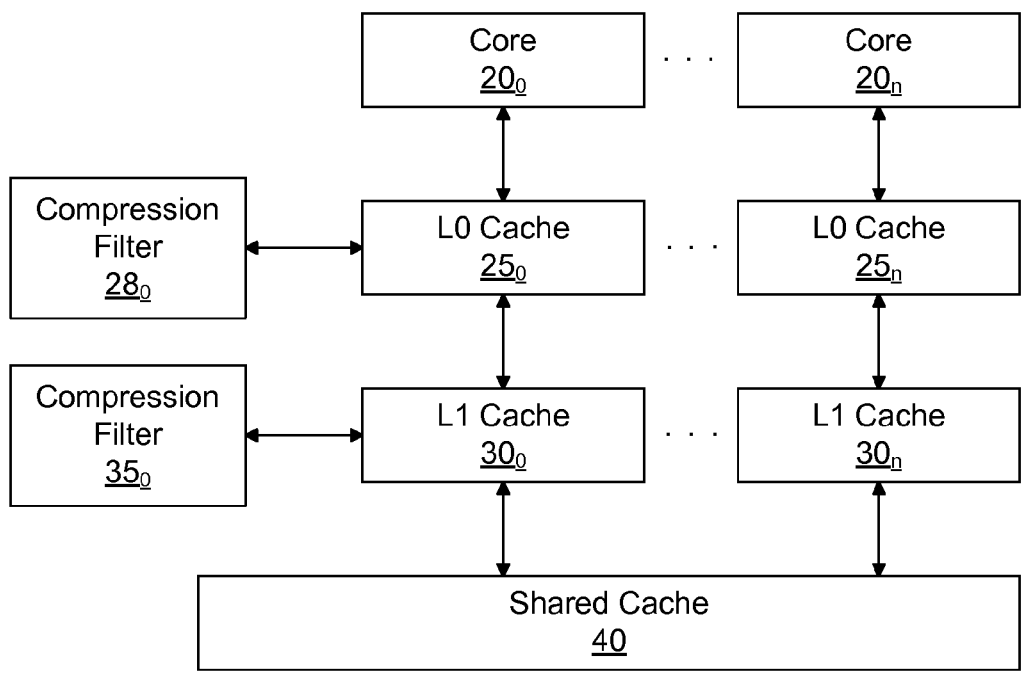
FIG. 1 is a high level block diagram of a processor in accordance with an embodiment of the present invention.

Referring now to FIG. 1, shown is a high level block diagram of a processor in accordance with an embodiment of the present invention. As shown in FIG. 1, processor 10 may be a multicore processor including a plurality of cores $20_0$-$20_n$ (generically core 20). Each core may include various structures including front end units, execution units, and retirement units. To provide for temporary storage of information, each core 20 may be coupled to a low level cache, e.g., a level 0 (L0) cache $25_0$-$25_n$ (generically cache 25). Each cache line in the cache may store various information, including status information, tag information, and data. In various embodiments, the status information can include transaction indicators, such as the above-described read-set and write-set indicators. In turn, this cache level can be coupled to a next higher cache level, e.g., a level one (L1) cache $30_0$-$30_n$ (generically cache 30). This cache level can be further from the core and may provide for storage of greater amounts of information. In turn, this level of cache memory can be coupled to a shared cache 40, which may be shared by all cores within the processor. Note that in various implementations, these caches can be dedicated data caches, dedicated instruction caches, or combined instruction-data caches. Furthermore, while not shown for ease of illustration, understand that intermediate storage between these cache levels, such as fill buffers, write back buffers, and victim caches, may also be present.

As further seen in FIG. 1, at least certain levels of the cache hierarchy may be associated with a corresponding compression filter. Shown in the embodiment of FIG. 1 are compression filters $28_0$ and $35_0$ (similar filters may be associated with other caches). Each of these filters may in an embodiment be Bloom filter configured to store read-set information (such as a hash value of a cache line address) when a cache line including information of a transaction is to be evicted to another cache level that does not provide for the storage of the status information described above. In other embodiments, each cache level may have a compression filter associated with it, regardless of the read and write-set status support of a next level in the hierarchy. For example, an exclusive L1/L2 hierarchy with dead block prediction and the transaction support described herein at both levels may include a filter at the L1 cache to hold blocks identified by the predictor as dead, instead of pushing them to the L2 cache.

Figure 2:
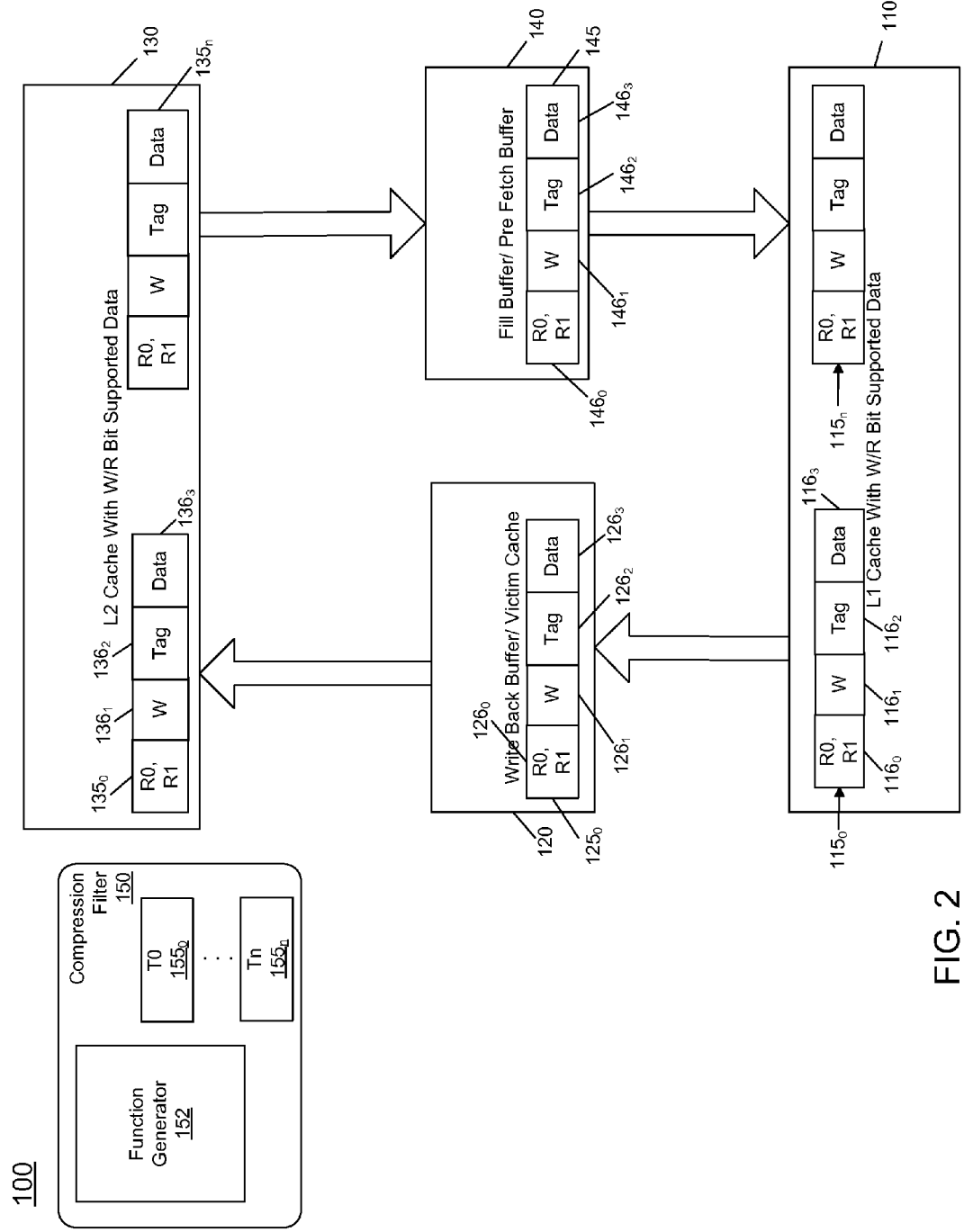
FIG. 2 is a block diagram illustrating further details of a cache hierarchy in accordance with an embodiment of the present invention.

Referring now to FIG. 2, shown is a block diagram illustrating further details of a cache hierarchy in accordance with an embodiment of the present invention. As shown in FIG. 2, cache hierarchy 100 may include multiple levels of a cache memory, along with certain intermediate structures and a compression filter as described herein. In the embodiment shown in FIG. 2, a lowest level cache may be an L1 cache memory 110 which can include a plurality of cache lines $115_0$-$115_n$. Cache memory 110 may support storage of state information associated with read and write-sets. Specifically as seen, cache line $115_0$ includes a read-set field $116_0$ which may include a plurality of read-set indicators, e.g., a bit for each thread to indicate whether the corresponding thread has read the data of the corresponding cache line during a transaction. Field $116_1$ may be a write-set indicator to indicate whether a thread has written to the cache line during the transaction. In addition, a tag field $116_2$ may be provided to store tag information, and a data field $116_3$ may provide for storage of data information.

Thus in various embodiments, to track transactional read-sets and write-sets two or more additional state bits can be stored per cache line in a data or shared instruction-data cache, namely W, R0, R1, . . . , RN. Each Rx-bit indicates the line belongs to the transactional read-set of thread x, where the maximum value of x is the number of threads that can simultaneously share data in the given cache. The W-bit indicates that the line belongs to the transactional write-set of one of the threads. When the W-bit is 1, exactly one Rx bit is also set 1 to indicate the thread of the write-set. When the W-bit is 1, the data stored for the cache line is the speculatively written value from within the transaction of thread x. Note that the data is invisible to threads other than x. In addition to inclusion of this state information in a data or shared instruction-data cache, the same state information (as to the read-set state information) can be stored per cache line in an instruction cache. These state bits are referred to as R0-RN, and perform exactly like the corresponding bits in data or shared instruction-data caches.

One or more additional state bits can be stored per cache line in a write back buffer (WBB) or victim cache (VC) structure that hold lines evicted from other caches. These state bits are referred to as W0, W1, . . . , WN and indicate that the entry belongs to the transactional write-set of a thread. Exactly zero or one of the W-bits can be 1 for a single entry. When a Wx-bit is 1, the data stored in the WBB or VC entry is the speculatively written value from within the transaction of thread x. The data is invisible to threads other than x. For simplicity, the WBB or VC state bits can also be encoded as those in the conventional caches described above (W, R0, R1, R2, etc.). Similarly, one or more additional state bits can be stored per cache line in a fill buffer (FB) or prefetch buffer (PRFB) structure that temporarily holds cache lines prior to allocation into a cache. These state bits are defined and function identically to those described above (see WBBs).

As seen, when a cache line is evicted from cache memory 110, it may be provided to a second level cache, namely a L2 or second level cache memory 130 that also provides for support for read-set and write-set status information. As seen, each cache line $135_0$-$135_n$ in cache memory 130 may similarly include a read-set field $136_0$ with read-set indicators for each thread, a write-set field $136_1$ to store a write-set indicator, a tag field $136_2$, and a data field $136_3$. In the illustration of FIG. 2, an interim cache structure, namely a write back buffer/victim cache 120 may be present to receive and store a cache line in an entry $125_0$ (with corresponding read-set field $126_0$, write-set field $126_1$, tag field $126_2$, and data field $126_3$) and, upon its eviction from this level, the cache line can be provided to cache memory 130.

Also shown in FIG. 2, another interim structure, namely a fill buffer/prefetch buffer 140 may be provided as an intermediate structure between cache memory 130 and cache memory 110. As seen here, each entry 145 within this storage may similarly include read and write-set indicators $146_0$ and $146_1$, along with tag and data portions $146_2$ and $146_3$.

Assume that a higher level cache to cache memory 130 such as a shared cache memory (not shown in FIG. 2) does not provide support for read and write-set indicators as described herein. Accordingly, a compression filter 150 may be associated with cache memory 130 to enable storage of certain information associated with cache lines including read-set information to enable correct transactional memory processing. As shown in FIG. 2, compression filter 150, which may be a Bloom filter, includes a plurality of filters $155_0$-$155_n$ each associated with a given thread. Each such filter may store a vector or other collection of bits that can identify whether a corresponding address is represented in the filter. As such the Bloom filter collectively maintains a representation of addresses having set R bits. In an embodiment, a single bit with a logic one value within the vector indicates possible presence of a set R bit for cache line addresses that hash to this bit. More specifically, a cache line address (or a tag or other identifier) may be applied to a function generator 152 which may perform a plurality of hash functions to thus generate a set of bits for storage in the indicated filter, where multiple bits may be set to correspond to the input address. Then when checking whether an address is represented within the compression filter, the address to be checked may be similarly applied to function generator 152. If less than all of the resulting bits are of a set state, this indicates that the corresponding address is not represented in the compression filter. Thus filter 150 may serve as secondary storage of read-set addresses, separated by thread. Each thread's filter can be cleared upon commit of its current transaction. Although shown at this high level in the embodiment of FIG. 2, understand the scope of the present invention is not limited in this regard.

Figure 3:
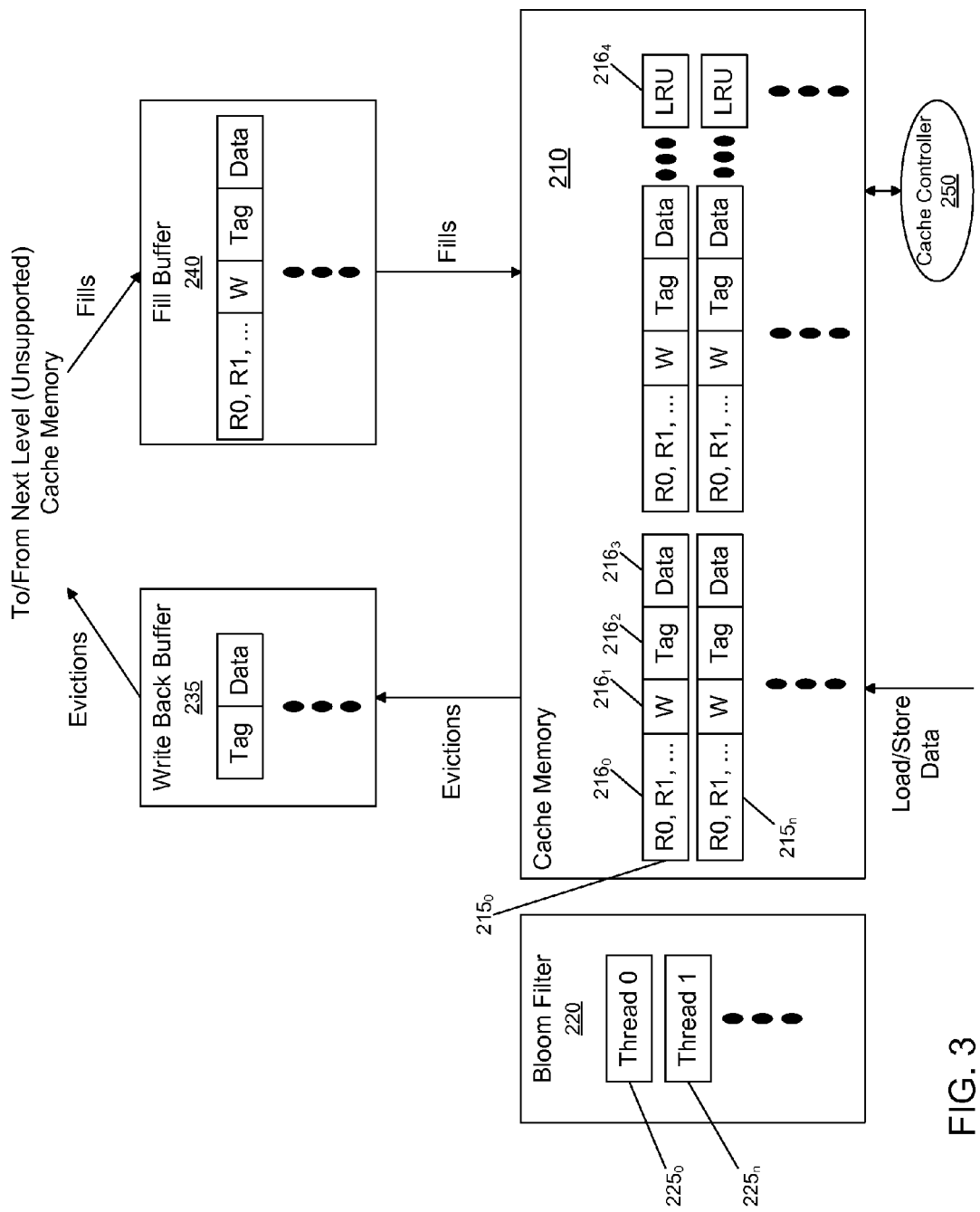
FIG. 3 is a block diagram of a process in accordance with one embodiment of the present invention.

FIG. 3 shows a more detailed description of the process a line may follow between a supported and unsupported level. In FIG. 3 there exist two separate threads of data and examples for the two possible paths departing from and arriving to the supporting level.

Firstly in FIG. 3 there exists a cache 210 containing cache lines $215_0$-$215_n$ including read-set indicators $216_0$, write-set indicators $216_1$, tag portions $216_2$, and data portions $216_3$, as described herein. The first example discussed is of a cache line traveling to an unsupported level in the cache. In this example a cache line is evicted from cache 210 to a level that does not support the read and write state indicators. The data follows an eviction system that gives preference to the eviction of data without the read/write set indicators due to the nature of the destination level. Thus there is a bias against evicting lines containing the read/write set indicators. However assume all elements within the cache contain active read/write set indicators, such that a least recently used (LRU) is used to determine which line is to be evicted to the adjacent level.

Once a cache line has been selected for eviction from the level, it undergoes a series of changes to allow for compatibility with the adjacent cache. Assume a cache line is evicted with a set write-set indicator. In this instance, the transaction is aborted, and accordingly the transaction is unrolled and either attempted again or a recovery mechanism is performed. For an eviction of a cache line with any set read-set indicators, an allocation into one or more compression filters may occur. In FIG. 3 a compression filter 220 contains a filter $225_{0-n}$ associated with each thread. Each filter can store a representation of a cache line address for evicted lines having set read-set indicators and will continue to hold such representations in order to track the transactional data until the transactional process commits. After these processes have been completed the datum is the transferred to the cache without the read/write set indicators, e.g., through a write back buffer 235.

Thus as shown, upon eviction from cache memory 210, if any read-set indicator associated with a given thread is of a set state (and the write-set indicator is clear), an allocation into a corresponding one of compression filters $225_0$-$225_n$ associated with the thread can occur. Then the given cache line (namely its tag and data portions) can be evicted to a write back buffer 235 which in an embodiment may be a first in first out buffer, such that upon reaching the head of the entry of this buffer, the given information can be evicted to a next higher cache level. Note however if a cache line to be evicted has a set write-set indicator, a transaction abort can occur. In various embodiments, handling of a transaction abort may include flushing the processor pipeline and so forth.

Additionally in FIG. 3 there exists the process through which datum may be entered into a supported level in the cache. In this case the data has been entered into a fill buffer 240. Within the fill buffer 240, the cache line exists as it would in any other supported level in the cache with the read and write set indicators intact. From the fill buffer the data can be read and subsequently written into the destination level.

As further seen in FIG. 3, data may further be written in cache memory 210 from a core or other processing engine (or a lower level cache). Incoming load or read operations which thus allocate a cache line within cache memory 110 may cause a given read-set indicator (namely associated with the thread issuing the load/read operation) can be set. Similarly, data from a lower cache level or processing engine may be written to cache memory 210 as a store/write operation. In these instances, the cache line to which this information is written may have its write-set indicator placed in a set state and similarly, a read-set indicator for the corresponding thread may also be set.

As further seen in FIG. 3, a cache controller 250 may be coupled to cache memory 210. In various embodiments, cache controller 250 may include logic to perform evictions of data from cache memory 210, e.g., due to a capacity constraint. In various embodiments, replacement state information $216_4$ may be associated with each line and can be used to indicate a relative age of the data. In various embodiments, this relative age may be expressed as a timestamp to thus indicate which cache line is the least recently used. In various embodiments, cache controller 250 may be configured with a replacement policy that favors retention of lines having a set write-set indicator and also favors retention of lines having one or more read-set indicators of a set state.

In general, operation of a cache hierarchy in accordance with an embodiment of the present invention is as follows: read accesses from thread x set the corresponding Rx bit in the L1 cache entry (more generally, any level of cache that can directly provide data to load instructions); and write accesses from thread x set the corresponding Rx bit and the W-bit in the L1 cache entry (more generally, any level of cache directly updated by store instructions).

Lines evicted from any level of cache to any other level of cache that supports read-set and write-set tracking carry their R-bits and W-bits to the next level of cache. This operation may include transference though an intermediate structure, such as a WBB or VC described above. Lines filled from any level of cache to a lower-level cache carry their R-bits and W-bits with them. This operation may include transference though an intermediate structure for tracking misses, such as a FB or prefetch buffer. Lines may also be refilled from a VC coupled between two levels of hierarchy rather than directly from the next level.

Note that read-set lines for which a corresponding Rx bit is set that are displaced from any level of cache and not transferred to a higher level of cache are instead transferred to each compression filter. Transferring the address to the compression filter maintains read-set tracking even though the cache line may no longer exist in the cache hierarchy with an R-bit set.

In various embodiments the replacement policies of all caches augmented with W-bits may be biased against eviction of lines with the W-bit set when the next level of cache hierarchy does not support W-bits for write-set tracking. For example, a cache implementing a least recently used (LRU) policy would choose the least recently used line without a W set when evicting to another level that does not have W-bits. This is so since loss of a W-bit line from the cache hierarchy aborts the speculative transaction for the corresponding thread, since the data from at least one transactional write is lost.) Similarly, the replacement policies of all caches augmented with R-bits are optionally biased against eviction of lines with any R-bit set. For example, a cache implementing a LRU policy would choose the least recently used line without any R set when evicting to another level that does not have R-bits. This can reduce capacity pressure on the compression-based filter. In various embodiments, W-bit lines may be favored over R-bit lines.

Embodiments thus provide read-set and write-set tracking state that can easily propagate through a cache hierarchy, making efficient use of existing hardware by using a compression-based filter to maintain read-set tracking for all cases in which a line is displaced and the R-bit information cannot be propagated elsewhere. Still further embodiments may give storage preference to W-bit lines to make the most efficient use of cache space for maintaining the transactional write-set data. In this way, embodiments can maintain larger transactional read-sets and write-sets and avoid pathological behavior caused by limited set-associated activity in caches. Still further, aliasing can be reduced or avoided by using the existing caches as the primary tracking mechanism, and can avoid additional storage and data paths for transactional write-set data.

Figure 4:
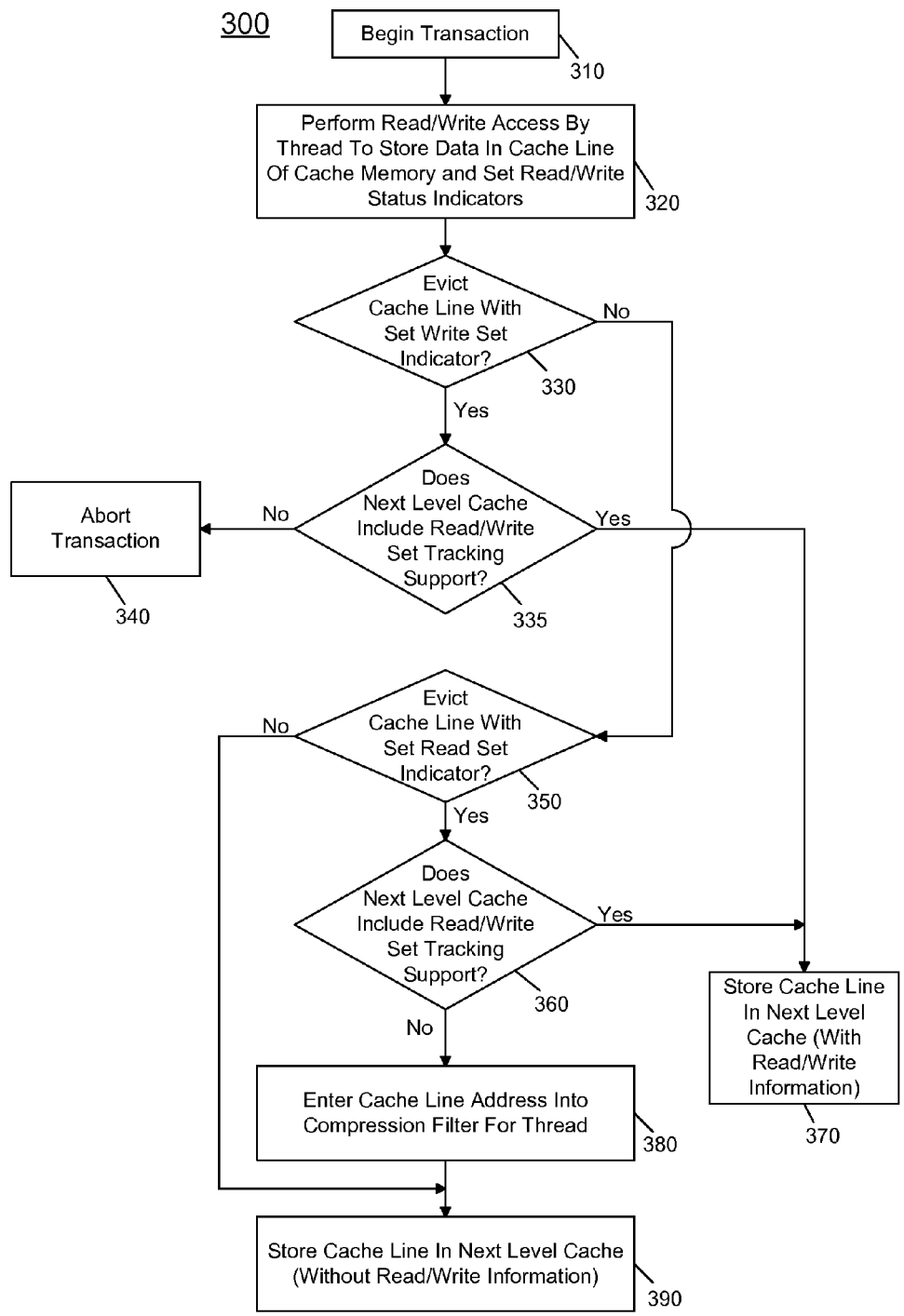
FIG. 4 is a flow diagram of operations within a transaction in accordance with an embodiment of the present invention.

Referring now to FIG. 4, shown is a flow diagram of example operations within a transaction in accordance with an embodiment of the present invention. Note that the flow shown in FIG. 4 is with regard to example operations that may occur during a transaction, and do not necessarily show a linear flow of actual operations that occur in a particular transaction. As shown in FIG. 4, method 300 may begin at block 310 by beginning a transaction. In various embodiments, a transaction may begin by setting up state for the transaction such as one or more storages for storage of information along with setting up various indicators and so forth to identify that a given thread is entering into a transaction. Next at block 320 read and/or write accesses may be performed by the thread to store data and to a given cache line in the cache memory and set appropriate read/write-set status indicators. That is, as described above, when a cache line is written into a cache during a transaction, a corresponding write-set status indicator may be set, along with a read-set status indicator associated with the thread that performs the write instruction. Similar operations to set a corresponding read-set status indicator may occur when a thread reads a cache line during a transaction.

Still referring to FIG. 4, it can be determined at diamond 330 whether a cache line is to be evicted that has a set write-set indicator. If so, control passes to diamond 335 to determine whether the next level cache includes write-set tracking support. If not, this could lead to an inconsistency in data during the transaction and as such, control passes to block 340 where the transaction can be aborted. Various operations in support of such transaction abort can occur such as cache and processor pipeline flushes among other operations. If such write-set support is present, control passes to block 370 where the cache line to be evicted can be stored in the next level cache along with its associated state data, including the write-set indicator (and at least one read-set indictor).

If the to-be-evicted cache line does not have a set write-set indicator, control passes from diamond 330 to diamond 350 where it can be determined if a cache line is evicted that has one more set read-set indicators. If so, control passes to diamond 360 where it can be determined whether the next level cache includes read/write set tracking support. If so, control passes to block 370 where the cache line that is to be evicted can be stored in the next level cache along with its associated state data, including the various read-set and write-set indicators. Otherwise if the next level cache does not provide such support, control passes instead from diamond 360 to block 380 where a cache line address for the to-be-evicted cache line can be entered into a compression filter for the thread that is associated with this cache memory. In this way, read-set tracking support can be maintained. From both of blocks 380 and diamond 350 (when a to-be-evicted cache line does not have a set read-set indicator or a write-set indicator) control passes to block 390 where the cache line can be stored in the next level cache. Although shown at this high level in the embodiment of FIG. 4, understand the scope of the present invention is not limited in this regard.

Figure 5:
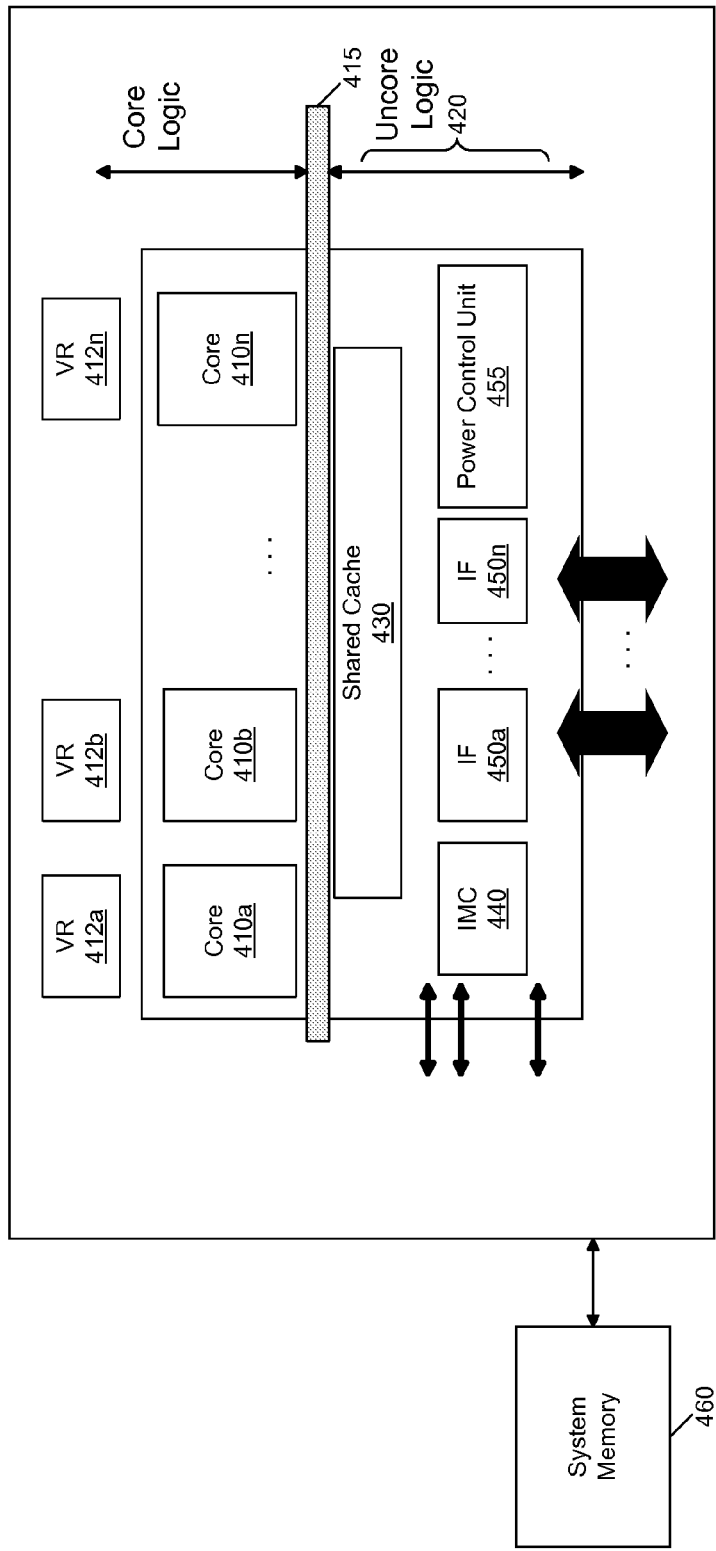
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be configured to operate at multiple voltages and/or frequencies. In addition, each core may be independently controlled to operate at a selected voltage and/or frequency. To this end, each core may be associated with a corresponding voltage regulator 412a-412n. While not shown for ease of illustration, understand that each core 410 can include transactional memory logic and one or more cache levels including read/write-set tracking support, along with one or more compression filters as described herein. The various cores may be coupled via an interconnect 415 to an uncore or system agent logic 420 that includes various components. As seen, the uncore 420 may include a shared cache 430 which may be a last level cache that may not have the read/write-tracking support. In addition, the uncore may include an integrated memory controller 440, various interfaces 450 and a power control unit 455.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
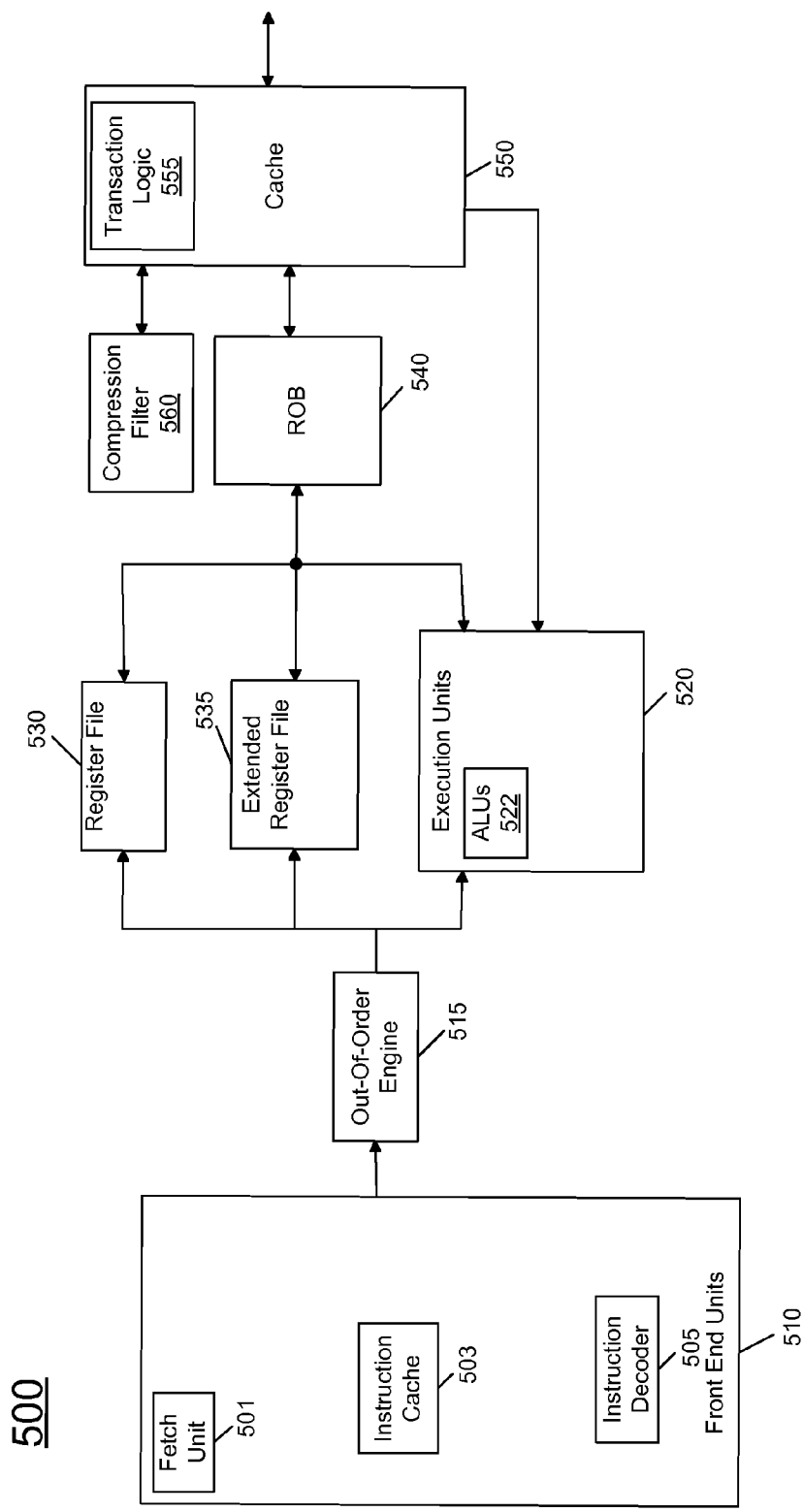
FIG. 6 is a block diagram of a processor core in accordance with one embodiment of the present invention.

Referring now to FIG. 6, shown is a block diagram of a processor core in accordance with one embodiment of the present invention. As shown in FIG. 6, processor core 500 may be a multi-stage pipelined out-of-order processor. As seen in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which in one embodiment may be a low level cache (e.g., an L1 cache) that includes read-set and write-set support. This tracking of read and write-sets can be performed by a transactional logic 555, which in an embodiment can be implemented via a cache controller. As further shown, a compression filter 560 may be coupled to cache 550 to maintain read-set tracking when cache lines having active read-set indicators are evicted to a different cache level. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
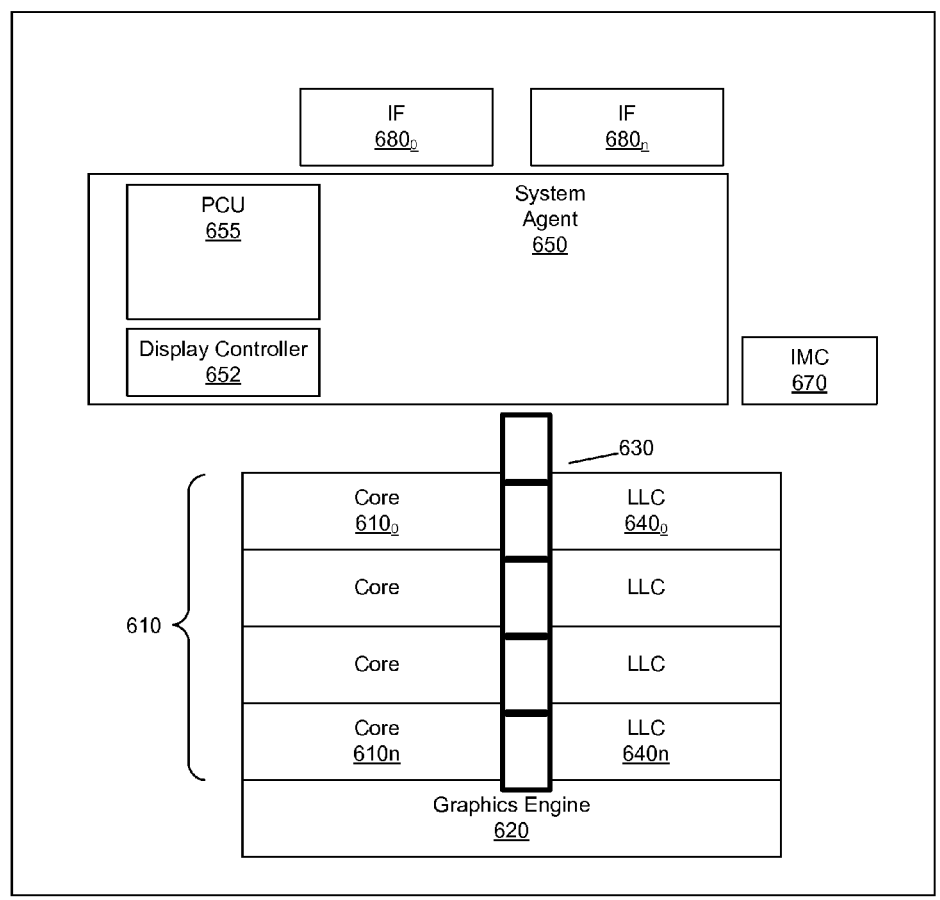
FIG. 7 is a block diagram of a multicore processor in accordance with another embodiment of the present invention.

Referring now to FIG. 7, shown is a block diagram of a multicore processor in accordance with another embodiment of the present invention. As shown in the embodiment of FIG. 7, processor 600 includes multiple domains. Specifically, a core domain 610 can include a plurality of cores $610_0$-$610n$, a graphics domain 620 can include one or more graphics engines, and a system agent domain 650 may further be present. In various embodiments, system agent domain 650 may handle power control events and power management. Each of domains 610 and 620 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 610 may further include low level caches (such as shown in FIG. 5) in addition to various execution units and additional processing elements. In turn, the various cores may be coupled to each other and to a shared cache memory formed of a plurality of units of a LLC $640_0$-$640_n$. In various embodiments, LLC 640 may be shared amongst the cores and the graphics engine, as well as various media processing circuitry. In some embodiments, this LLC may provide for read/write-set tracking support as described herein. As seen, a ring interconnect 630 thus couples the cores together, and provides interconnection between the cores, graphics domain 620 and system agent circuitry 650.

As further seen, system agent domain 650 may include display controller 652 which may provide control of and an interface to an associated display. System agent domain 650 also may include a power control unit 655.

As further seen in FIG. 7, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
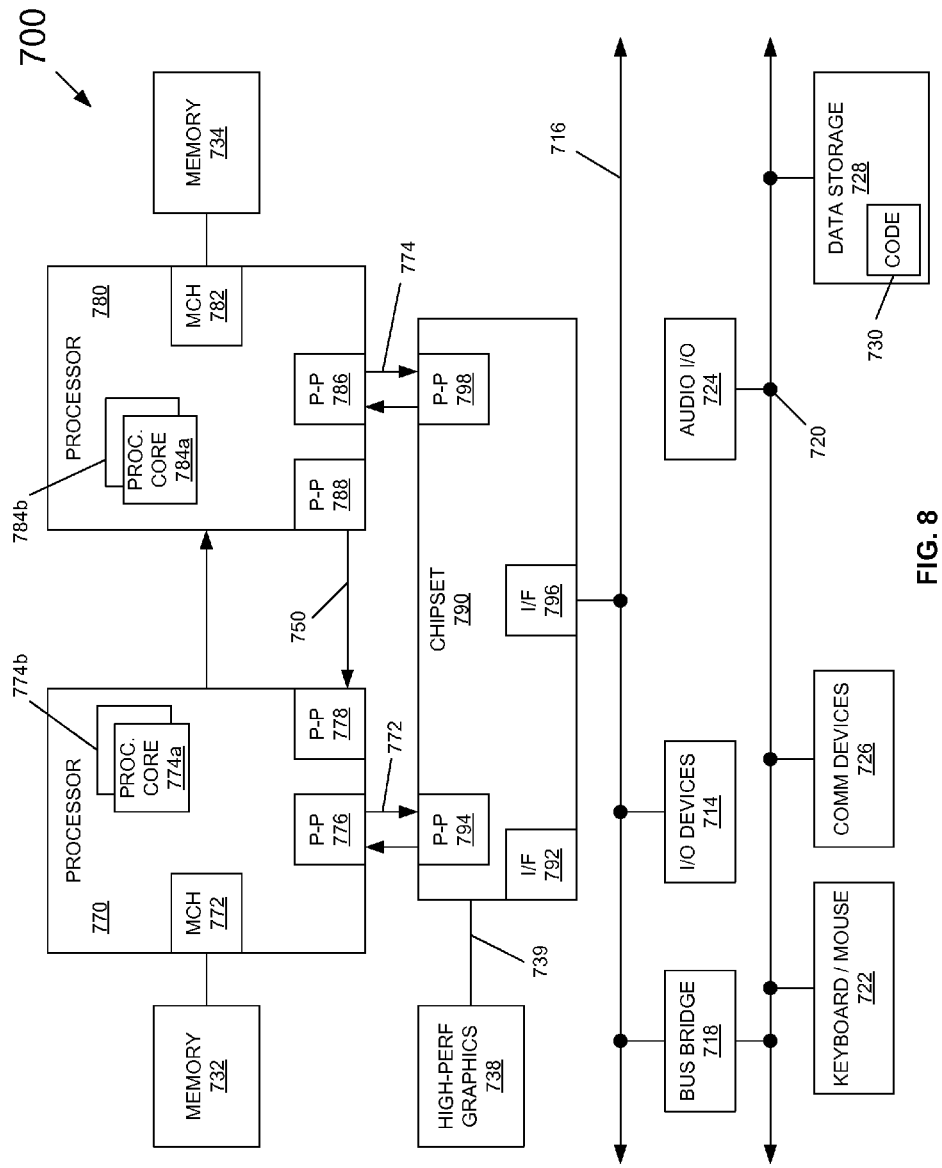
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774a and 774b and processor cores 784a and 784b), although potentially many more cores may be present in the processors. Each of the processors can include transactional memory logic and one or more transaction-supported caches to enable efficient propagation of read and write-set tracking, as described herein.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
  a cache memory to store a plurality of cache lines, each including a tag portion, a data portion, a write-set field to store a write-set indicator to indicate whether data stored in the data portion has been speculatively written during a transaction of a transactional memory, and a read-set field to store a plurality of read-set indicators comprising a bit for each particular thread of a plurality of threads to indicate whether the particular thread of the plurality of threads has read the data stored in the data portion of the cache line before the transaction has committed; and
  a compression filter associated with the cache memory, the compression filter including a first filter storage to store a representation of a cache line address of a cache line read by a first thread of the plurality of threads before the transaction has committed.

2. The processor of claim 1, further comprising a second cache memory coupled to the cache memory to store a plurality of second cache lines, wherein the second cache lines do not include a write-set field or a read-set field.

3. The processor of claim 2, further comprising a controller to store the representation when the cache line is evicted from the cache memory to the second cache memory.

4. The processor of claim 1, wherein the processor is to abort the transaction when a cache line including a write-set indicator having a first state to indicate that data in the data portion has been speculatively written during another transaction is evicted before the transaction is committed.

5. The processor of claim 4, wherein the processor is to commit the transaction when a plurality of cache lines speculatively written during the transaction have not been evicted from the cache memory.

6. The processor of claim 4, wherein the processor is to write a second state to the write-set indicator when the transaction has been committed.

7. The processor of claim 1, further comprising a write back buffer coupled between the cache memory and a second cache memory, the write back buffer including a plurality of entries each to store a tag portion and a data portion of a cache line evicted from the cache memory, the entries of the write back buffer not including a write-set field or a read-set field.

8. The processor of claim 1, further comprising a function generator to receive a cache line address and perform a plurality of hash functions on the cache line address to obtain the representation of the cache line address to store in the first filter storage.

9. A method comprising:
performing, via a first thread of a plurality of threads, a read transaction of and during a transaction of a transactional memory to read a first data and storing the first data in a first cache line of a first cache memory, the first cache line including a tag portion, a data portion, a write-set field, and a read-set field, the read-set field including a plurality of read-set indicators comprising a bit associated with each thread of the plurality of threads to identify a particular thread of the plurality of threads and to indicate whether the particular thread has read the first data before the transaction has committed;
setting a read-set indicator of the read-set field associated with the first thread to indicate that the read transaction occurred during the transaction;
performing, via the first thread, a write transaction of and during the transaction to write a second data and storing the second data in a second cache line of the first cache memory, the second cache line including a write-set field; and
setting a write-set indicator of the write set field to indicate that the write transaction occurred during the transaction.

10. The method of claim 9, further comprising evicting the second cache line from the first cache memory prior to commitment of the transaction, and causing the transaction to abort responsive to the eviction.

11. The method of claim 9, further comprising:
evicting the first cache line from the first cache memory during the transaction; and
writing the first cache line including the read-set field into a second cache memory.

12. The method of claim 9, further comprising:
evicting the first cache line from the first cache memory during the transaction;
writing the first cache line without the read-set field into a second cache memory; and
storing a representation of an address of the first cache line in a storage associated with the first cache memory to maintain read-set tracking.

13. A system comprising:
a processor including a transaction logic, a first cache memory to store a plurality of cache lines each including a data portion, a write-set field to store a write-set indicator to indicate whether data in the data portion has been speculatively written during a transaction of a transactional memory, and a read-set field to store a plurality of read-set indicators comprising a bit each for a particular thread of a plurality of threads to indicate whether the particular thread of the plurality of threads has read the data in the data portion during the transaction, and a first filter storage to store a representation of an address of a cache line having a set read-set indicator evicted from the first cache memory during the transaction, to maintain read-set tracking of a read-set of the transaction; and
a dynamic random access memory (DRAM) coupled to the processor.

14. The system of claim 13, wherein the processor further comprises a second cache memory to store a plurality of second cache lines, wherein the second cache lines do not include a write-set field or a read-set field.

15. The system of claim 14, wherein the transaction logic is to cause the address representation of the cache line to be stored when the cache line is evicted from the first cache memory to the second cache memory.

16. The system of claim 13, wherein the transaction logic is to abort the transaction when a cache line including a write-set indicator having a first state to indicate that data in the data portion has been speculatively written is evicted before the transaction is committed.

17. The system of claim 16, wherein the processor further comprises a Bloom filter including the first filter storage associated with a first thread and a second filter storage associated with a second thread.

18. The system of claim 14, wherein the processor further comprises a buffer coupled between the first cache memory and the second cache memory.

19. The system of claim 18, wherein the transaction logic is to cause the address representation to be stored into the first filter storage and to further cause the data portion of the cache line to be stored into an entry of the buffer and to discard the read-set field and the write-set field of the cache line.

20. The system of claim 13, wherein the processor further comprises a function generator to receive the address and perform a plurality of hash functions on the address to obtain and store the address representation of the cache line in the first filter storage.

* * * * *